United States Patent [19]

Harrison

[11] Patent Number: 5,710,763
[45] Date of Patent: Jan. 20, 1998

[54] FILTERED FAST FOURIER TRANSMULTIPLEXER AND METHOD

[75] Inventor: Robert Mark Harrison, Grapevine, Tex.

[73] Assignee: Motorola, Inc., Schaumburg, Ill.

[21] Appl. No.: 509,123

[22] Filed: Jul. 31, 1995

[51] Int. Cl.$^6$ .................................................. H04J 1/05
[52] U.S. Cl. .............................................. 370/307; 370/478
[58] Field of Search ...................................... 370/307, 478, 370/210, 484, 497

[56] References Cited

U.S. PATENT DOCUMENTS

| | | | |
|---|---|---|---|
| 3,991,277 | 11/1976 | Hirata | 370/484 |
| 4,101,738 | 7/1978 | Bellanger et al. | 370/484 |
| 4,112,374 | 9/1978 | Steinbrecher | 455/6.2 |
| 4,206,320 | 6/1980 | Keasler et al. | 370/204 |
| 4,230,956 | 10/1980 | Steinbrecher | 327/122 |
| 4,237,551 | 12/1980 | Narasimha | 370/307 |
| 4,316,282 | 2/1982 | Macina | 370/484 |
| 4,355,405 | 10/1982 | Ruys et al. | 375/275 |
| 4,393,456 | 7/1983 | Marshall, Jr. | 370/307 |
| 4,492,962 | 1/1985 | Hansen | 342/369 |
| 4,514,760 | 4/1985 | Balaban et al. | 348/484 |
| 4,517,586 | 5/1985 | Balaban et al. | 348/572 |
| 4,621,337 | 11/1986 | Cates et al. | 364/727 |
| 4,652,858 | 3/1987 | Kokubo et al. | 341/144 |
| 4,759,013 | 7/1988 | Ishiyoshi | 370/307 |
| 4,785,447 | 11/1988 | Ichiyoshi | 370/210 |
| 4,799,179 | 1/1989 | Masson et al. | 364/724.1 |
| 4,803,727 | 2/1989 | Holt et al. | 381/1 |
| 4,876,542 | 10/1989 | van Bavel et al. | 341/143 |
| 4,881,122 | 11/1989 | Goeckler et al. | 348/47 |
| 4,881,191 | 11/1989 | Morton | 364/724.13 |
| 4,884,265 | 11/1989 | Schroeder et al. | 370/484 |
| 4,893,316 | 1/1990 | Janc et al. | 375/271 |
| 5,043,933 | 8/1991 | Boutaud et al. | 364/724.1 |
| 5,101,501 | 3/1992 | Gilhousen et al. | 455/33.2 |
| 5,103,459 | 4/1992 | Gilhousen et al. | 370/209 |
| 5,109,390 | 4/1992 | Gilhousen et al. | 370/335 |
| 5,136,612 | 8/1992 | Bi | 370/342 |
| 5,159,608 | 10/1992 | Falconer et al. | 375/200 |
| 5,170,413 | 12/1992 | Hess et al. | 375/260 |
| 5,187,809 | 2/1993 | Rich et al. | 455/3.1 |
| 5,220,557 | 6/1993 | Kelley | 370/345 |
| 5,224,122 | 6/1993 | Bruckert | 375/200 |
| 5,278,837 | 1/1994 | Kelley | 370/343 |
| 5,289,464 | 2/1994 | Wang | 370/330 |
| 5,293,329 | 3/1994 | Wishart et al. | 364/724.13 |
| 5,295,153 | 3/1994 | Gudmundson | 370/335 |
| 5,299,192 | 3/1994 | Guo et al. | 370/210 |
| 5,313,279 | 5/1994 | Wang et al. | 348/426 |
| 5,323,157 | 6/1994 | Ledzius et al. | 341/143 |
| 5,323,391 | 6/1994 | Harrison | 370/210 |
| 5,347,284 | 9/1994 | Volpi et al. | 342/356 |
| 5,396,489 | 3/1995 | Harrison | 370/210 |
| 5,406,629 | 4/1995 | Harrison et al. | 380/34 |
| 5,454,011 | 9/1995 | Shimoyoshi | 375/240 |

FOREIGN PATENT DOCUMENTS

95/12261  5/1995  WIPO .

OTHER PUBLICATIONS

IEEE Transactions on Communications, vol. COM-22 No. 9, Sep. 1974, "TDM-FDM Transmultiplexer: Digital Polyphase and FFT", Bellanger et al.

Harris Semiconductor Digital Signal Processing Databook, "Numerically Controlled Oscillator/Modulator", HSP45116, pp. 5-26/5-40, Harris Corporation.

(List continued on next page.)

*Primary Examiner*—Douglas W. Olms
*Assistant Examiner*—Min Jung
*Attorney, Agent, or Firm*—Richard A. Sonnentag

[57] ABSTRACT

A filter fast Fourier transmultiplexer divides a multi-channel communication signal into single channel communication signals through a cascade of filters and mixers. The output sample rate is maintained at the input sample rate and memory requirements and computations are substantially reduced.

16 Claims, 6 Drawing Sheets

$W = e^{\frac{-j2\pi}{c}}$

OTHER PUBLICATIONS

Fundamentals of Digital Image Processing by Anil K. Jain, University of California, Davis, 1989 by Prentice–Hall, Inc., pp. 155–159, 185–187.

"Robust Digital Filter Structures", 7–3 Cascade Form Digital Filter Structures, Handbook for Digital Signal Processing by Sanjit Mitra and James Kaiser, John Wiley & Sons 1993.

Hogenauer, Eugene B. "An Economical Class of Digital Filters for Decimation and Interpolation", IEEE Transactions on Acoustics, Speech and Signal Processing, vol. ASSP–29, No. 2.

ETSI–SMG, GSM 06.31, 4.0.0, Discontinuous Transmission (DTX) for Full Rate Speech Transmission Channels, Oct. 1992.

ETSI–SMG, GSM 96.12, 4.0.1, Comfort Noise Aspects for Full Rate Speech Traffic Channels, Jan. 1993.

EIA/TIA/IS–95, Requirements for Base Station CDMA Operation, pp. 7-1/7–185, Appendix A Requirements for CDMA Service OptionsA–1/A–68.

"Multirate Techniques in Filter Banks and Spectrum Analyzers and Synthesizers" by Ronald E. Crochiere and Lawrence R. Rabiner, Chapter 7 from Multirate Digital Signal Processing, 1983 by Prentice–Hall, Inc., pp. 289–404.

"Nine Digital Filters for Decimation and Interpolation" by David J. Goodman et al., IEEE Transactions on Acoustics, Speech, and Signal Processing, vol. ASSP–25, No. 2, Apr. 1977, pp. 121–126.

FILTERED FAST FOURIER TRANSMULTIPLEXER AND METHOD

FIELD OF THE INVENTION

The present invention relates to multi-channel digital transceivers, and more particularly, to a filtered fast Fourier transmultiplexer and a method of transmultiplexing a multi-channel communication signal in a multi-channel digital transceiver.

BACKGROUND OF THE INVENTION

There are numerous advantages to implementing a radio communication system using digital techniques. Notably, there is enhanced system capacity, reduced noise, and reduced hardware and associated power consumption. There has been proposed several digital radio communication systems. For example, there is shown and described in the commonly assigned U.S. patent application entitled "Multi-Channel Digital Transceiver and Method" Ser. No. 08/366,283 filed on Dec. 29, 1995, and U.S. Pat. No. 5,396,489 the disclosures of which are hereby expressly incorporated herein by reference, several preferred embodiments of radio communication systems implementing digital techniques.

In multi-channel transceivers, it is known to use transmultiplexers to recover individual communication channels from a multi-channel communication signal. Such a transmultiplexing device is shown in FIG. 1 embodied in a digital receiver 100. As shown, multi-channel radio frequency (RF) signals are received at antenna 102, band pass filtered 104, down converted 106, IF filtered 108, down converted to baseband 110, filtered 112 and digitized 114. The digitized multi-channel signals are then communicated to a transmultiplexer 116 which includes an interpolating polyphase filter stage 118 and a fast Fourier transform (FFT) stage 120. The output of transmultiplexer 116 are N communications channels separated from the digitized multi-channel signal. One will readily appreciate that operated in reverse, the structure shown in FIG. 1 operates to process N channels for transmission as a multi-channel RF signal from an antenna.

Transmultiplexers, however, generally are not capable of producing high sample rate outputs and operate best when the input and output sample rates are different by a factor equal to the number of channels. Also, transmultiplexers do not provide opportunities to utilize special filter structures. They are limited as to not being able to take advantage of symmetry, and generally can not be made without multipliers. In addition, typical transmultiplexers require a large number of filter taps, 10 times or more as many as the number of channels, and therefore a large amount of memory. Hence, transmultiplexers are performance limited and computationally and memory inefficient.

Therefore, there is a need for a high performance, efficient transmultiplexing device and method for use with digital transceivers. Such a device and method are provided by the present invention, and one of ordinary skill in the art will readily appreciated the many advantages and features of the present invention from the following detailed description and accompanying drawings.

DETAILED DESCRIPTION OF A PREFERRED EMBODIMENT

Figure 1:
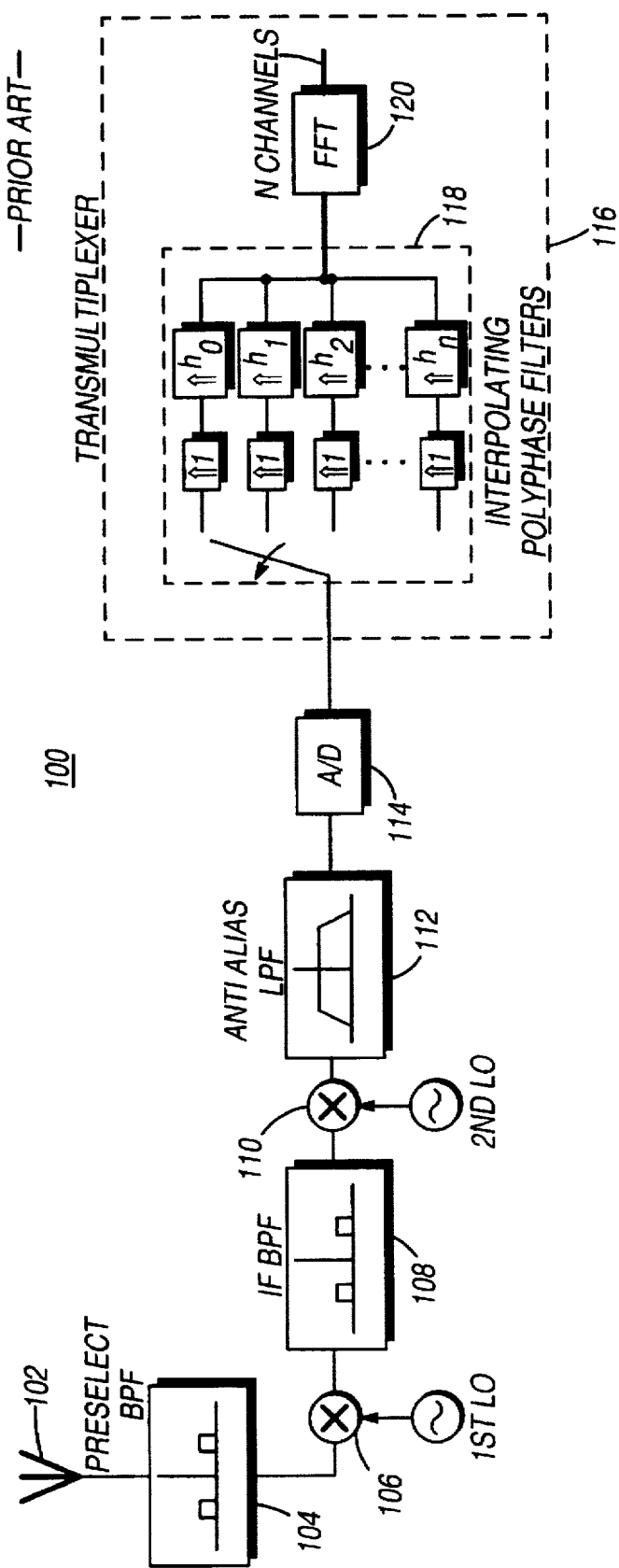
FIG. 1 is a block diagram of a prior art multi-channel digital receiver.
Figure 2:
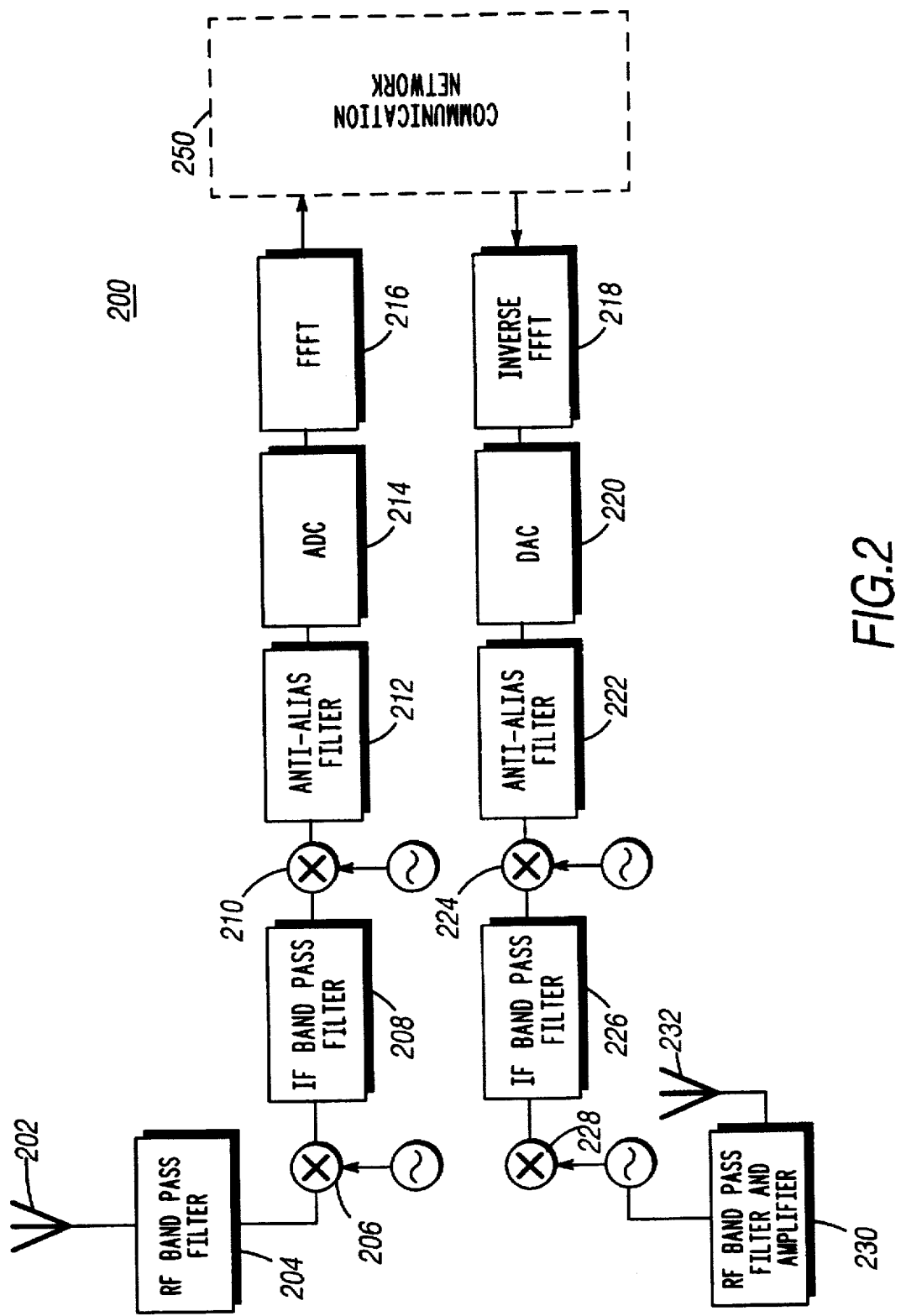
FIG. 2 is a block diagram of a multi-channel transceiver in accordance with a preferred embodiment of the present invention.

With reference to FIG. 2 a multi-channel digital transceiver 200 is coupled to a communication network 250. It will be appreciated that transceiver 200 may be advantageously utilized in nearly any multi-channel communication system such as cellular radiotelephone communication systems, cable television (CATV) telephony systems, and the like. Transceiver 200 includes in a receive path a receive antenna 202, a RF bandpass filter 204, a RF-to-intermediate frequency (IF) mixer 206, an IF bandpass filter 208, an IF-to-baseband mixer 210, an anti-alias filter 212, an analog-to-digital converter (ADC) 214, and a filtered fast Fourier transmultiplexer (FFFT) 216. In a transmit path, transceiver 200 includes an inverse-FFFT 218, a digital-to-analog converter (DAC) 220, anti alias filter 222, a baseband-to-IF mixer 224, IF bandpass filter 226, an IF-to-RF mixer 228, an RF bandpass filter and amplifier 230 and transmit antenna 232.

In operation in receive mode, multi-channel communication signals are received at antenna 202 and processed along the receive path to FFFT 216 which operates to downconvert the channels contained within the multi-channel communication signal to produce a block of N communication channels which are then coupled to communication system 250. Similarly in transmit, a block of N communication channels are communicated from communication system 250 to inverse FFFT 218 which operates to upconvert the individual communication channels into a multi-channel communication signal which is then processed along the transmit path and ultimately radiated from transmit antenna 230.

Figure 3:
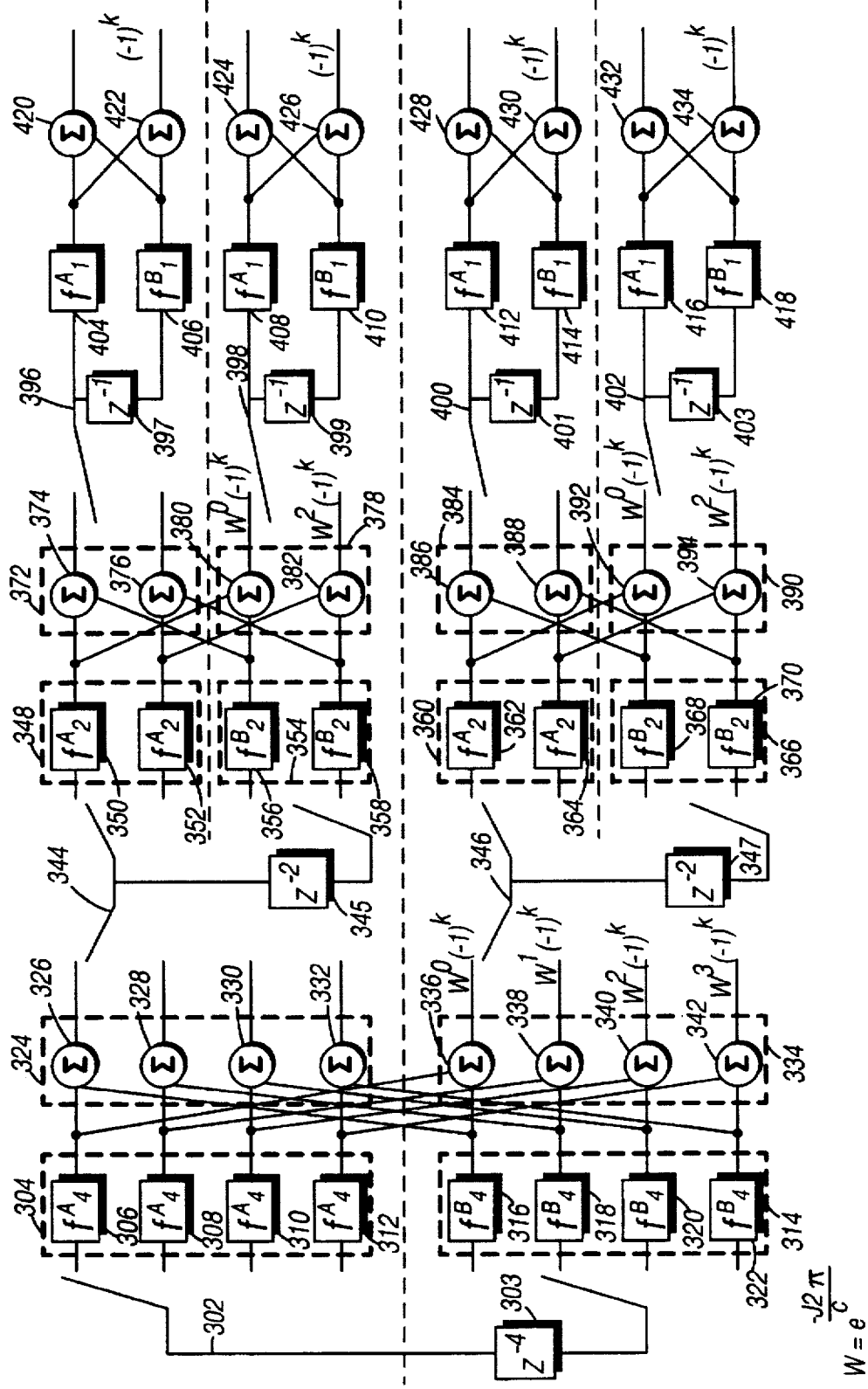
FIG. 3 is a block diagram of a preferred implementation of a filtered fast Fourier transform (FFFT) for use with the transceiver of FIG. 2.

With reference to FIG. 3, a preferred implementation of FFFT 216 is shown; it being understood that a similar structure although reverse of FFFT 216 is the preferred implementation of inverse FFFT 218. FFFT 216 structure generally resembles a decimation in time Cooley-Tukey FFT structure with filters on each branch. As shown in FIG. 3, FFFT 216 includes a commutator 302 which commutates an input multi-channel communication signal to a first filter stage 304 having a plurality of filters 306–312 and via delay element 303 to a second filter stage 314 having a plurality of filters 316–322. In a preferred implementation filters 306–312 and 316–322 are substantially the same, however, it should be understood that the filters may be of different types or coefficients. The outputs from filter stages 304 and 314 are cross summed in summing stages 324 and 334 each having summers 326–332 and 336–342, respectively. While indicated as a summing operation, a "–" provided before the summation sign is intended to indicate a subtraction. The outputs of summers 336–342 of summing stage 334 are further scaled by a time varying coefficient. In the preferred embodiment, the outputs of summers 336–342 are scaled by:

$$W^n(-1)^k \quad (1)$$

where W is $$W = e^{\frac{-j2\pi}{c}}, \quad (2)$$

k is the instant sample, n is the branch index x is equal to π, and c is a constant related to the number of channels.

At the outputs of summing stages 324 and 334 are commutators 344 and 346. Commutator 344 commutates the outputs of summing stages 324 to a third filter stage 348 having filters 350 and 352 and via a delay element 345 to a fourth filter stage 354 having filters 356 and 358. Similarly, commutator, 346 commutates the scaled outputs of summing stage 334 to filter stages 360 and via a delay element 347 to filter stage 366 having filters 362, 364 and 368, 370, respectively. The outputs of filter stages 348 and 354 are cross summed in summing stages 372 and 378 having summers 374, 376 and 380 and 382, respectively. Likewise, the outputs of filter stages 360 and 366 are crossed summed in summing stages 384 and 390 having summers 386, 388 and 392, 394 respectively. The outputs of summing stages 384 and 390 are further scaled by a time varying coefficient.

At the outputs of summing stages 372, 378 384 and 390, are commutators 396, 398, 400 and 402. Commutators 396, 398, 400 and 402 operate similar to those previously described to commutate the outputs of summing stages 372, 378, 384 and 390 to filters 404, 408, 412 and 416 and via delay elements 397, 399, 401, and 403 to filters 406, 410, 414, 418, respectively. The outputs of filters 404–418 are then crossed summed by summers 420–434, and the outputs of summers 422, 426, 430 and 434 are scaled by a value $(-1)^k$.

Figure 4:
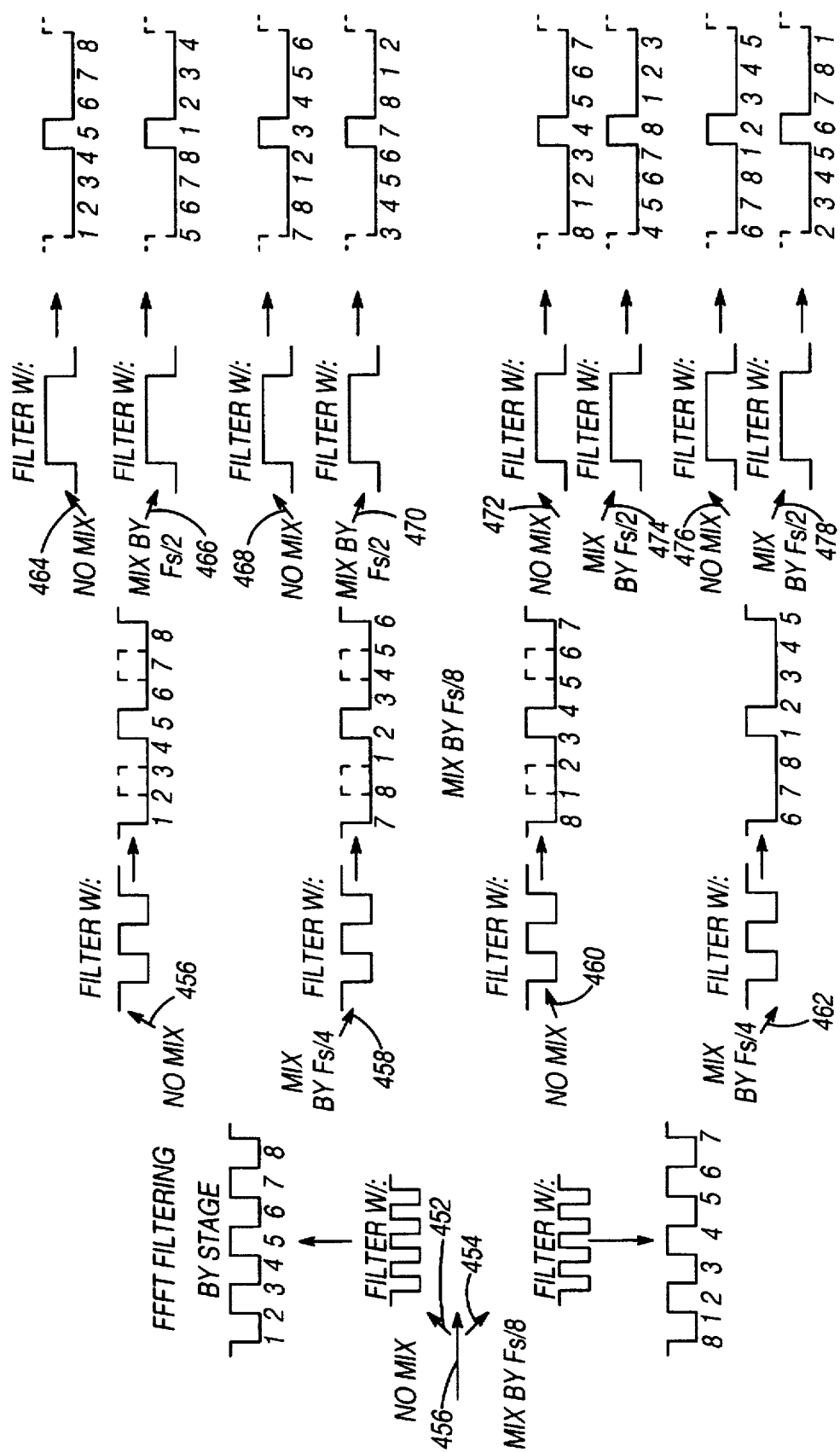
FIG. 4 is a signal diagram illustrating the operation of the FFFT of FIG. 3.

The operation of FFFT 216 is best understood with reference to FIGS. 3 and 4 and by considering it as a series of comb filters with mixers at each input. The multi-channel input signal 450 comes in from the left side of the page (FIG. 4) where it is separated into two paths 452 and 454. Path 452 is passed directly through the filters (i.e. filter stage 304) while path 454 is filtered (i.e., filter stage 314) and mixed such that the spectrum is moved by one channel. The filters eliminate every other channel on each path 452 and 454 leaving four unattenuated signals on each path. Next, the paths 452 and 454 are broken into four paths 456–462 which are similarly filtered or filtered and mixed leaving the four paths 456–462 with two channels per branch. Finally, paths 456–462 are broken into eight paths 464–478 which are again filtered or filtered and mixed as appropriate. This leaves the eight paths 464–478 with one channel per path. Hence a multi-channel signal containing eight channels is separated into eight signals with one channel per signal, all of which are at the input sample rate and with the desired channel at baseband.

The mixing, i.e., scaling with the time varying coefficient, is shown advantageously following the summing. However, one will readily appreciate that the mixing may be performed prior to summing or prior to filtering, as the case may be, without departing from the fair scope of the present invention.

Figure 5:
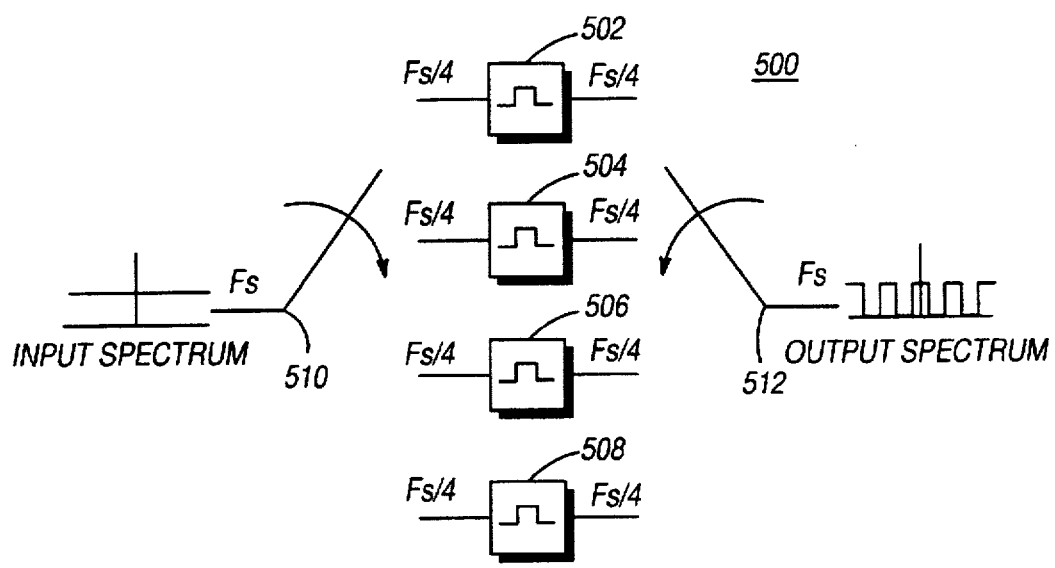
FIG. 5 is a block diagram of a preferred filter structure for use in accordance with the present invention.

With reference now to FIG. 5, a preferred filter structure 500 for use with the FFFT is shown. Filter 500 is preferably a comb filter structure including a plurality of low pass filters 502–508 which attenuate half of the input spectrum replicated N times, where N is half the number of channels. Filters 502–508 form a branch which commutator 510, 512 distributes every Nth sample to. This means that each filter input is decimated by N. An equivalent structure is one where the filter is upsampled by N in a single branch with a filter having spectrum consisting of N relicas, i.e., comb teeth, of the desired response. Filter 500 is useful because of the sharp rolloffs created without increasing filter order.

Figure 6:
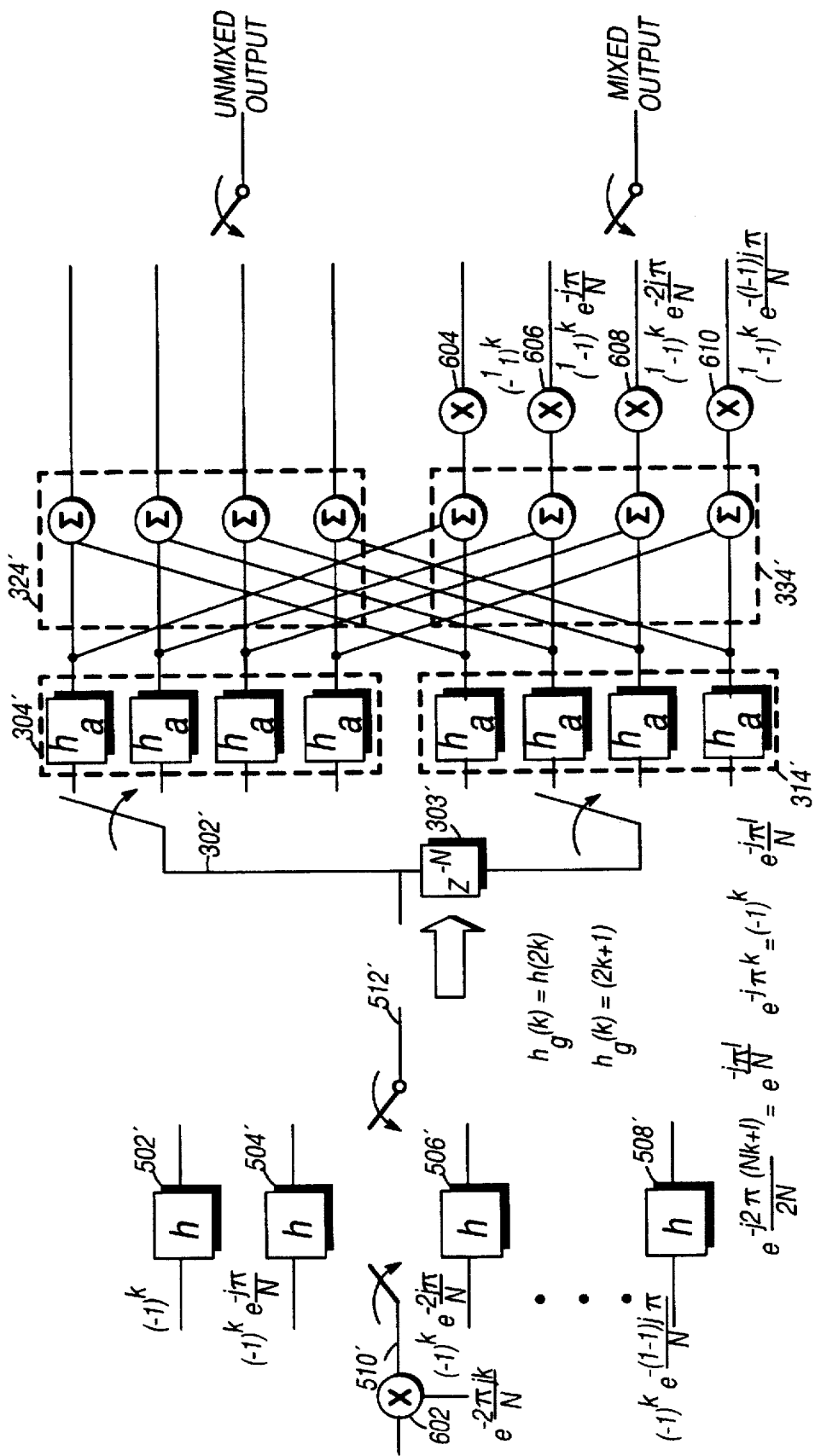
FIG. 6 is a block diagram of an alternate preferred implementation of a filter structure for use in accordance with the present invention.

With reference to FIG. 6, preferred filter structure 500 is illustrated adapted to a portion of FFFT 216, with analogous elements to filter structure 500 and FFFT 216 being indicated with a prime ('). The input commutator 510' includes a mixer 602 which mixes the input multi-channel signal with a complex sinusoid having a frequency of Fs/(2N), N being the number of branches. As described above, each branch contains an input sample decimated by N, the samples associated with each branch are therefore multiplied by:

$$(-1)^k e^{\frac{-(l-1)j\pi}{N}} \quad (3)$$

where l is the branch index x is equal to π and k is the instant sample. This means that each branch is multiplied by a constant times ±1. In the preferred embodiment, the multiplication, i.e., multipliers 604–610, is moved to the filter output as described. This advantageously allows for the use of a single comb filter for both the mixed and unmixed branches.

Figure 7:
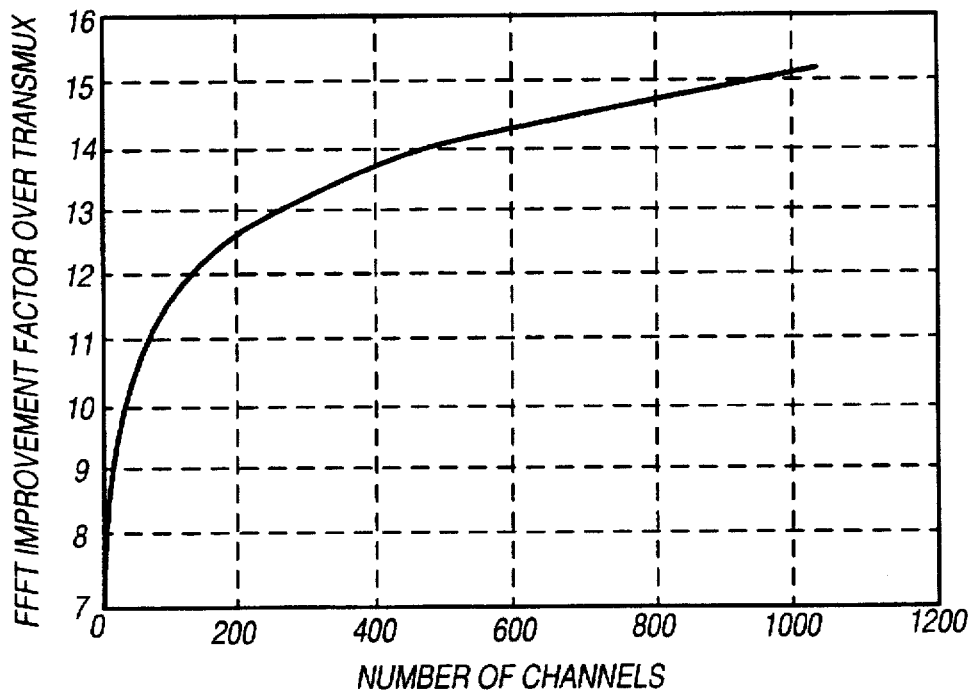
FIG. 7 is chart illustrating the computational performance of an FFFT in accordance with a preferred embodiment of the present invention.

FIG. 7 illustrates an improvement factor, i.e., the reduction in computation, for the FFFT of the present invention over the typical transmultiplexer. Moreover, FFFT 216 has a considerable memory advantage. The filters of FFFT 216 may advantageously be hardwired eliminating storage of filter coefficients. In contrast, a typical transmultiplexer will require the storage of $CM'_o$ filter taps, where C is the number of channels and $M'_o$ is the computation cost, in shift—adds per output sample, of the leftmost, i.e., most complex, filter. A 1024 channel transmultiplexer with eleven taps per branch will therefore require about 11 Kwords of memory.

As one of ordinary skill the art will appreciated from the foregoing discussion, the present invention provides a computationally and memory efficient apparatus and method for use in multi-channel transceivers through a unique filtered fast Fourier transmultiplexer structure. Many additional features and advantages and the fair scope of the present invention is readily discerned from the foregoing discussion and the subtended claims.

What I claimed is:

1. A method of transmultiplexing a multi-channel information signal at a first sample rate into a plurality of selected communication channels at the first sample rate, the method comprising the steps of:

(a) commutating the information signal to a first plurality of filters and commutating a delayed sample of the information signal to a second plurality of filters, each filter of the first plurality of filters corresponding with a filter of the second plurality of filters;

(b) summing an output of each filter of the first plurality of filters with an output from the corresponding filter of the second plurality of filters to form a first plurality of summed outputs;

(c) summing a scaled output of each of the second plurality of filters with an output of the corresponding filter of the first plurality of filters to form a second plurality of summed outputs;

(d) scaling each output of the second plurality of summed outputs by a time varying value;

(e) commutating the first plurality of summed outputs to form a first output signal at the first sample rate; and (f) commutating the scaled second plurality of summed outputs to form a second output signal at the first sample rate.

2. The method of claim 1 wherein the step of scaling each of the second plurality of summed outputs by a time varying value comprises scaling each of the second plurality of summed outputs by a complex exponential.

3. The method of claim 1 wherein the step of commutating the information signal to a first plurality of filters comprises commutating the information signal to a first plurality of substantially identical filters.

4. The method of claim 1 wherein the step of commutating a delayed sample of the information signal to a second plurality of filters comprises commutating a delayed sample of the information signal to a second plurality of substantially identical filters.

5. The method of claim 1 wherein the step of summing a scaled output of each of the second plurality of filters with an output of the corresponding filter of the first plurality of filters to form a second plurality of summed outputs comprises subtracting an output of each of the second plurality of filters from an output of the corresponding filter of the first plurality of filters.

6. The method of claim 1 further comprising the step of communicating the plurality of selected communication channels to a multi-channel communication system.

7. An apparatus for transmultiplexing a multi-channel information signal at a first sample rate into a plurality of selected communication channels at the first sample rate comprising:

(a) means for commutating the information signal to a first plurality of filters and commutating a delayed sample of the information signal to a second plurality of filters, each filter of the first plurality of filters corresponding with a filter of the second plurality of filters;

(b) means for summing an output of each filter of the first plurality of filters with and output from the corresponding filter of the second plurality of filters to form a first plurality of summed outputs;

(c) means for summing a scaled output of each of the second plurality of filters with an output of the corresponding filter of the first plurality of filters to form a second plurality of summed outputs;

(d) means for scaling each output of the second plurality of summed outputs by a time varying value;

(e) means for commutating the first plurality of summed outputs to form a first output signal at the first sample rate; and (f) means for commutating the scaled second plurality of summed outputs to form a second output signal at the first sample rate.

8. The apparatus of claim 7, wherein the means for commutating the information signal further comprises means for commutating the first output signal.

9. The apparatus of claim 8 wherein in the means for commutating the first output signal to a first plurality of filters is operable for commutating the first output signal to a third plurality of filters and the means for commutating a delayed sample of the first output signal to a second plurality of filters is operable for commutating a delayed sample of the first output signal to a fourth plurality of filters.

10. The apparatus of claim 7, wherein the means for commutating the information signal further comprises means for commutating the second output signal.

11. The apparatus of claim 10 wherein in the means for commutating the second output signal to a first plurality of filters is operable for commutating the second output signal to a third plurality of filters and the means for commutating a delayed sample of the second output signal to a second plurality of filters is operable for commutating a delayed sample of the second output signal to a fourth plurality of filters.

12. The apparatus of claim 7 wherein the time varying value comprises a complex exponential.

13. The apparatus of claim 7 wherein the first plurality of filters comprises a plurality of substantially identical filters.

14. The apparatus of claim 7 wherein the second plurality of filters comprises a plurality of substantially identical filters.

15. The apparatus of claim 7 wherein the means for summing a scaled output of each of the second plurality of filters with an output of the corresponding filter of the first plurality of filters to form a second plurality of summed outputs is operable for subtracting an output of each of the second plurality of filters from an output of the corresponding filter of the first plurality of filters.

16. A filtered fast Fourier transmultiplexer comprising:

a commutator having an input and a first output and a second output, wherein the first output selectively couples a sample of a multi-channel information signal to inputs of a first plurality of filters, and the second output selectively couples a delayed sample of the multi-channel information signal to inputs of a second plurality of filters; the first and second plurality of filters each having an output;

a first plurality of combiners each coupled to an output of one the first plurality of filters and to an output of a corresponding filter of the second plurality of filters, each of the first plurality of combiners having an output;

a second plurality of combiners each coupled to an output of one of the second plurality of filters and to an output of the corresponding filter of the first plurality of filters, each of the second plurality of combiners having an output;

a plurality of scalers each having an input coupled to an output of one of the second plurality of combiners and an output;

a second commutator for commutating the outputs of the first plurality of filters to a first output signal at the sample rate; and a third commutator for commutating the outputs the plurality of scalers to a second output signal at the sample rate.

* * * * *